Aug. 11, 1964    A. FABULA ET AL    3,144,117
COMB PLATE FOR BELT TYPE MOVING SIDEWALK
Filed Aug. 12, 1958

HERMAN RUDOLPH YOST
ANDREW FABULA

INVENTORS

BY *J. L. Sharon*    ATTORNEY

United States Patent Office 3,144,117
Patented Aug. 11, 1964

3,144,117
COMB PLATE FOR BELT TYPE MOVING
SIDEWALK
Andrew Fabula, Hohokus, and Herman Rudolph Yost,
Lincoln Park, N.J., assignors to Otis Elevator Company, New York, N.Y., a corporation of New Jersey
Filed Aug. 12, 1958, Ser. No. 754,679
4 Claims. (Cl. 198—16)

This invention relates to conveyors and more particularly to continuous surface type conveyors having a landing plate or platform at the end of travel.

In a continuous surface type conveyor, a landing plate or platform is usually provided at the end of travel of the moving work surface. Usually a gap or space exists between the moving surface and the leading edge of the stationary landing plate to prevent frictional contact and undue wear of the parts. This gap between the moving surface, which may be a belt, and the stationary landing plate presents a possibility of catching and jamming small objects in transit, or loose clothing or parts of passengers to the possible detriment of the objects, clothing, or parts. There is also the possibility of damage to the conveyor if large objects are drawn into this gap.

The same unfortunate possibilities existed in the early moving stairways and were met by providing the stairway steps with longitudinal ribs or treads and the landing plate or platform with teeth that intermeshed with the ribs in such fashion that objects were "combed" from the moving steps and thus denied the possibility of falling in the gap. In time the leading edge of the landing plate or platform became known as a comb plate.

Heretofore the conventional belt-type conveyor has not used cooperating longitudinal ribs or treads and a comb at the leading edge of the landing plate because of the much greater component of lateral movement in moving belts than in the steps of moving stairways. This greater lateral movement requires excessive lateral clearance between the comb plate teeth and the belt ribbing such as to nullify the utility of the arrangement or the comb plate teeth interfered with the belt ribbing. This lateral belt movement is caused by a number of varying factors such as random loading, non-uniformity of belt dimensions, and misalignment of supporting structure or of the driving mechanism, and under the usual operating conditions is difficult to avoid. Consequently, continuous surface type conveyors have conventionally utilized an endless belt having an essentially smooth carrying surface with a fixed, straight-edged landing plate or platform, thus either risking the possibilities hereinbefore mentioned with respect to the gap, or closing the gap at the cost of increased wear of the parts and increased use of operating power.

It is therefore an object of this invention to provide a moving surface type conveyor in which the loading and unloading of passengers or objects are facilitated and safeguarded.

Another object of the invention is to provide such a conveyor in which the possibility of damage to the conveyor by objects in transit being caught in the conveyor is eliminated.

Another object of the invention is to provide a conveyor having a landing plate or platform at the end of travel in which the moving surface or belt and the landing plate or platform cooperate to close the gap therebetween.

It is a further object of the invention to provide in a continuous surface type of conveyor, a work surface having longitudinal ribs or treads and a leading edge of the landing plate or platform which intermeshes with these treads and moves laterally in substantially exact unison with such movement of the work surface.

Other objects and a fuller understanding of the invention may be had by referring to the following description and claims, taken in conjunction with the accompanying drawings in which:

Figure 4:
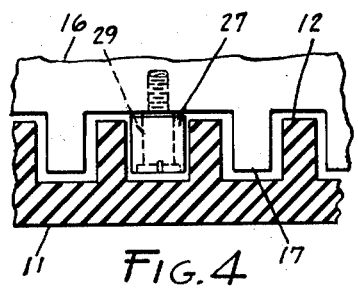
FIGURE 4 is a partial vertical sectional view of a comb plate, the teeth of which are intermeshed with the ribs of a conveyor surface and in which a guide roller has been substituted for a comb tooth.
Figure 1:
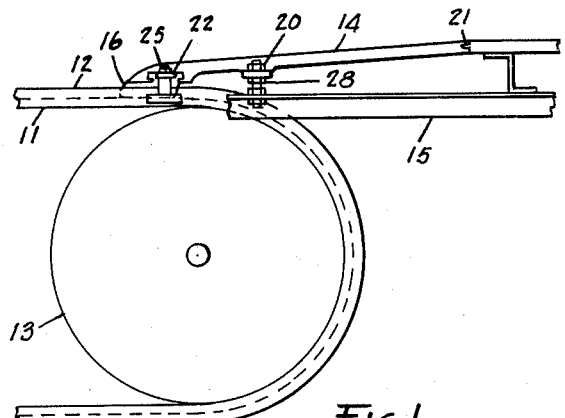
FIGURE 1 is a diagrammatic side view of one end of a belt conveyor embodying a preferred form of the invention.
Figure 2:
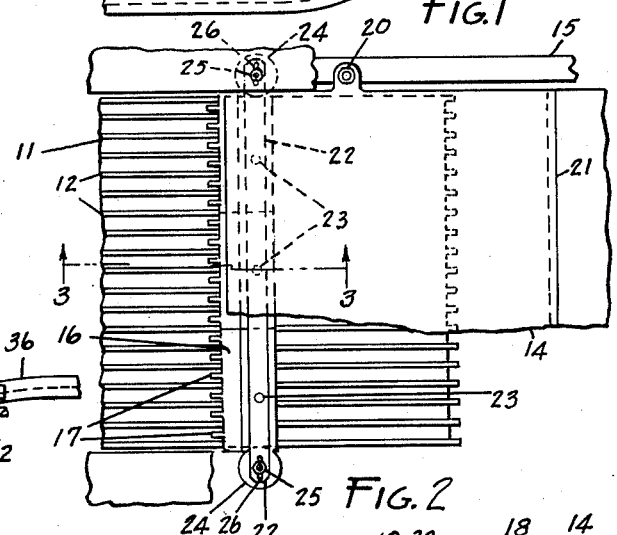
FIGURE 2 is a plan view of FIGURE 1 with part of the landing plate cut away.
Figure 3:
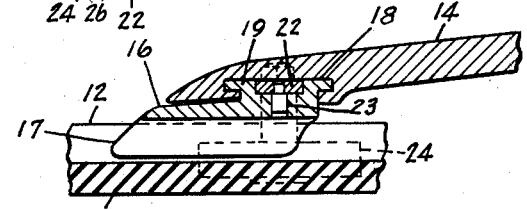
FIGURE 3 is an enlarged sectional side view taken along line 3—3 of FIGURE 2.
Figure 6:
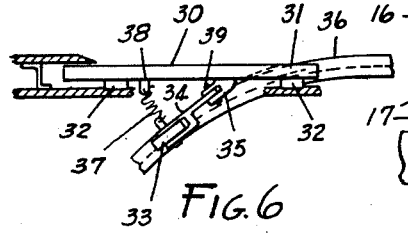
FIGURE 6 is a side view of FIGURE 5.
Figure 5:
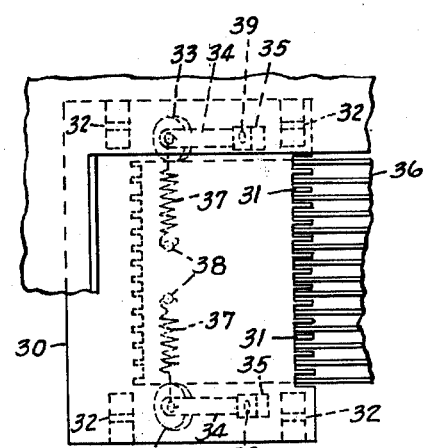
FIGURE 5 is a plan view of an alternative embodiment of the invention.

In the drawings, FIGURES 1, 2 and 3 show a preferred embodiment of the invention, and FIGURES 4, 5 and 6 illustrate alternative arrangements of the invention.

The drawings show portions of a belt type conveyor which may be supported and driven in any suitable manner. However, it should be understood that the continuous working surface may be of any suitable structure, such as, for example, articulated platforms, if desired.

Referring to FIGURES 1, 2 and 3, one end of a belt conveyor is illustrated in which a portion of a conveyor belt 11 with a plurality of longitudinal ribs 12 runs over a conventional pulley 13. A landing plate 14 at the end of travel for loading or unloading the conveyor is secured to the supporting structure 15 by any suitable means, such as, for example, is done with moving stairways. A comb plate 16 is slidably mounted for lateral movement on the leading edge of the landing plate allowing the teeth 17 of the comb to intermesh with the plurality of ribs 12 on the belt and to move as these ribs move laterally. The slidable mounting comprises a T-shaped slot 18 running transversely on the underside of the leading edge of the landing plate and a T-shaped bar section 19 of comb plate 16 for cooperative sliding engagement with the slot. By so mounting the comb plate, only the leading edges of the teeth are exposed to a small portion of the weight of each object carried for a comparatively short period of time, as a glance at FIGURE 1 will reveal. Thus the load offers little interference with the freedom of the comb plate to move laterally.

The comb plate 16 may be formed in three sections for economy in replacing damaged teeth. Thus only a short section in which damage occurs need be replaced rather than the entire comb plate. The sections are held together as a unit by a comb plate bar 22 having three pins 23 equally spaced that fit respectively into a retaining hole properly located in the upper surface of each of the three comb sections. The comb plate bar also mounts a guide roller 24 under each of its ends for rotation about a substantially perpendicular axis to that of the belt at that point. The guide rollers are adjustable laterally by loosening nuts 25 and moving the guide rollers to their desired positions wtihin the limits of mounting slots 26 and then retightening the nuts. The guide rollers are adjusted so that each of their perimeters just touches the respective edge with which it is associated of the conveyor belt. Any lateral movement of the belt at the comb plate will be transmitted by the guide rollers to the comb plate 16 by means of the comb plate bar 22 and pins 23, thus positioning the comb plate such that its teeth continue to be intermeshed with and in alignment with the longitudinal ribs of the belt but not in touching relationship with any of them.

To replace a section of the comb plate, remove hold-down nuts 20 and raise the landing plate about the rotating joint 21, thus disengaging the comb plate teeth from the belt ribs and the guide rollers from the belt edges. The comb plate and comb plate bar assembly is then slid in either direction out of the T slot and the comb plate sections will fall free of the retaining pins 23 as they clear the T slot. The damaged section is replaced, the retaining pins reengaged in the respective comb plate sections and the comb plate and comb plate bar assembly reinserted in the T slot. The landing plate is lowered and its leading edge adjusted vertically by rotating adjusting nut 28 to raise or lower the leading edge until the bottom of the comb plate teeth clear the bottom of the conveyor grooves.

The teeth of a comb plate slidably mounted as just described except for the guide rollers could be directly used without guide rollers to position the comb plate by means of the cooperation of the comb plate teeth with the belt ribbing. However the belt exercises a honing action on the comb plate teeth when in direct contact with them and they are sharpened dangerously in a short time. FIGURE 4 illustrates a way of positioning the comb plate with the teeth withouth sharpening them. A section of the comb plate is provided with a roller tooth 27 mounted for rotation about a substantially vertical stud 29 in the place of a regular tooth. The diameter of the roller tooth is made greater than the width of the other teeth but not wide enough to fill completely the groove between two adjacent ribs on the conveyor belt. When the comb plate teeth are intermeshed with the belt ribbing 12, the roller tooth will be the first and only tooth to come into contact with its adjacent belt ribbing as the belt moves laterally, and will be the sole means through which the lateral motion of the belt is transmitted to the comb plate. Thus there will be no honing of any of the comb plate teeth; the roller tooth rotating on its stud 29 when in contact with the belt ribs, and the other teeth never coming into contact with the other belt ribs although remaining aligned and intermeshed with them. Comb plate sections are replaceable as previously described. The roller tooth can be replaced by raising the landing plate as described for replacing comb plate sections and unscrewing the roller tooth stud 29 with a screw driver. Remove the roller tooth over the threaded end of the stud and slide a new roller tooth in its place. Replace the stud in the comb plate and lower and secure landing plate as previously described.

FIGURES 5 and 6 illustrate another embodiment of the invention. A combination landing and comb plate 30 having comb teeth 31 as an integral part of its leading edge is mounted for lateral motion on four longitudinal rollers 32. Guide rollers 33 are mounted for rotation on arms 34, pivoted at 39 to brackets 35 which are secured to the landing plate. The guide rollers are respectively spring biased against the respective edges of a conveyor belt 36 by having for each roller one end of a spring 37 attached to arm 34 and the other to a landing plate stud 38. The guide rollers follow any lateral motion of the conveyor belt by swinging about their pivots 39, increasing the tension in one spring and slackening it in the other thus causing the comb plate to move laterally in cooperation with the belt and keeping the comb teeth intermeshed and in alignment with the belt ribs.

Subject matter common to all figures of the drawing and the embodiment of the invention exemplified by FIGURES 5 and 6 are being claimed in divisional application of Samuel Gustave Margles, Serial No. 820,224, filed June 15, 1959.

Although the invention has been described with a certain degree of particularity, it is to be understood that the present disclosure has been made only by way of example and that numerous changes in the details of construction and the combination and arrangement of parts may be resorted to without departing from the spirit and scope of the invention as hereinafter claimed. For example, one guide roller 24 mounted as illustrated in FIGURE 2 with a spring 37 such as shown in FIGURE 5 in either tension or compression attached however to the guide roller and any stationary structure to bias the said guide roller against the edge of the conveyor belt would also be effective in making the comb plate follow the belt in all lateral movements of the belt. The plate 14 itself may be termed the comb plate, as has been done in the past with moving stairways, and in that case the plate 16 would be termed the comb or comb portion of the comb plate, with the remainder of the comb plate the load supporting portion.

What is claimed is:

1. A conveyor comprising, an endless belt having a plurality of longitudinal ribs forming the load carrying surface, a comb plate at an end of travel of the conveyor, said comb plate having an immovably affixed load supporting portion and a movable comb portion, said comb portion having teeth intermeshing with said ribs, means for supporting said movable comb portion on and beneath said immovable load supporting portion for lateral movement thereof with respect to said supporting portion, said means comprising a laterally extending slot in one of said portions, and a cooperatingly shaped laterally extending bar formed on the other of said portions and slidable in said slot and positioning said comb member beneath and partially covered by said immovable load supporting portion, and positioning means responsive to lateral shifting of said belt at said comb plate for laterally shifting said comb portion to maintain the desired intermeshing relationship of said comb teeth with said ribs.

2. A conveyor as set forth in claim 1, characterized in that the positioning means for the comb portion comprises a roller tooth slightly larger in diameter than the width of the regular teeth mounted on said comb portion in place of a regular tooth, said roller tooth being mounted for rotation about a substantially vertical axis and making contact with the two adjacent ribs with which it is intermeshed so as to follow them in lateral movement to position the said comb portion.

3. A conveyor as set forth in claim 1, characterized in that said positioning means comprises a guide roller mounted for rotation at one side of said belt, the rim of said roller being resiliently pushed against said side of belt to move with lateral movement of said belt, and said guide roller being connected to said comb portion for moving it in response to lateral movement of the said belt.

4. A conveyor comprising, an endless belt having a plurality of longitudinally extending ribs forming the load carrying surface, a comb plate at an end of travel of the conveyor, said comb plate having a load supporting portion and a comb portion, said comb portion having teeth intermeshing with said ribs, a T-shaped bar section extending laterally across the top of said comb portion, the forward end of said load supporting portion on its under side being formed with a slot to receive said guide for supporting said comb portion and enabling lateral movement thereof with respect to said load supporting portion to take place, said guide and slot being positioned so that only a small part of the forward end of the comb portion is exposed, and a guide roller supported by said comb portion with its rim resiliently engaging an edge of the belt for guiding said comb portion to maintain the desired intermeshing relationship of said comb teeth with said ribs.

References Cited in the file of this patent

UNITED STATES PATENTS

| | | |
|---|---|---|
| 1,112,836 | Reno | Oct. 6, 1914 |
| 2,030,103 | Dunlop | Feb. 11, 1936 |
| 2,535,501 | Loughridge | Dec. 26, 1950 |

FOREIGN PATENTS

| | | |
|---|---|---|
| 798,211 | France | May 12, 1936 |
| 1,120,628 | France | July 10, 1956 |